3,506,781
OPTICAL IMAGE DISPLAY SYSTEM
Allen C. Munster, Ann Arbor, Mich., assignor to Conductron Corporation, Ann Arbor, Mich., a corporation of Delaware
Filed June 17, 1966, Ser. No. 558,328
Int. Cl. H04n 5/20
U.S. Cl. 178—7.2        7 Claims

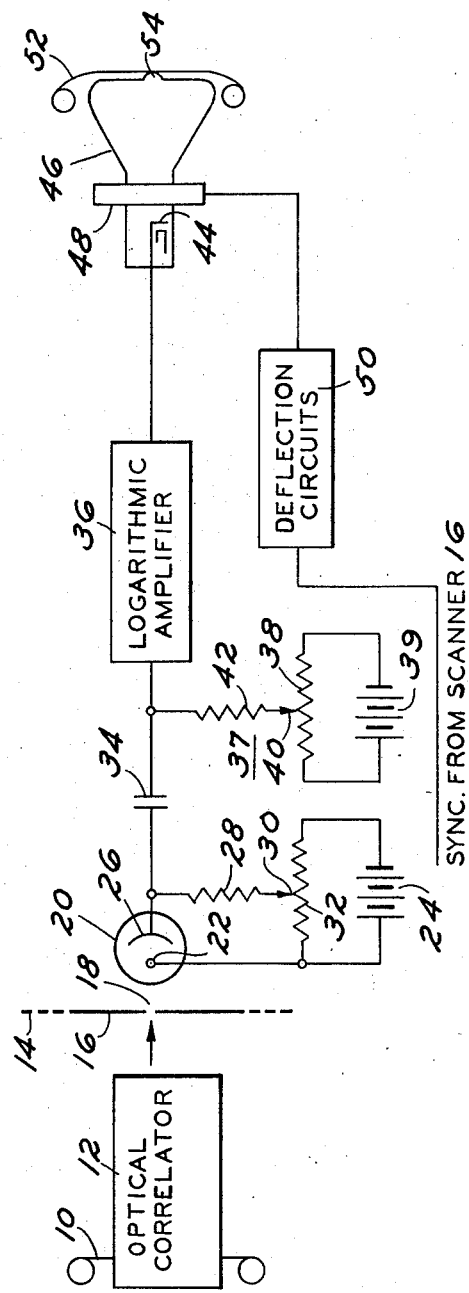

ABSTRACT OF THE DISCLOSURE

An optical image display system is disclosed wherein an image derived from an optical data processor is converted to an electrical signal. The electrical signal is applied to a non-linear circuit which is responsive only to the instantaneous values of the signal and operates to compress the dynamic range of the signal. Means are provided for adjusting both the maximum and minimum instantaneous output signals of the non-linear device. Thus, the dynamic range of the signals may be adjusted so that no saturation occurs in the optical output of the display or in the recording medium while, at the same time, ensuring that all data is displayed with sufficient intensity to be readable in the display output and registerable in the recording medium.

---

This invention relates generally to an improved optical image display system and, more particularly, to such a system provided with means for controlling the output dynamic range of signals from an optical data processor.

Most optical data processors use photographic film for both data input and data output. The signal processing operation is performed by combining coherent light rays, thereby generally resulting in an output signal having a greater dynamic range than the input signal. Frequently, the dynamic range of the output signal exceeds the recording capabilities of the output film or other output data display device and/or the capabilities of the human eye in interpreting such data. Such an undesirable result is called saturation.

Consequently, there is a great need for a device which will reduce the output dynamic range in some predetermined and controllable manner. Certain materials now exist which have the property of becoming more opaque as the incident light is increased and theoretically could function as dynamic range compressors. However, since this non-linear opacity is a characteristic of the property of the material, it is difficult to control in order to select a desired characteristic. Furthermore, the known materials are effective only at very high light levels.

Therefore, the primary object of the invention is to provide an image display system having means for compressing in a predetermined and controllable manner the dynamic range of the various light intensities in the output image of an optical data processor.

Another object of the invention is to provide an image display system for displaying without saturation the optical image containing a wide range of light intensities.

A further object of the invention is to provide an image display system including photoelectric means for converting an optical image to an electric signal which is used to control an optical display or recording device to present the image data without saturation.

A specific object of the invention is to provide an image display system including means for converting an optical image to an electrical signal which is then operated upon by non-linear circuit means to compress the dynamic range of the signal so that it may be used to control an optical display means for displaying the image without saturation.

A more specific object of the invention is to provide such a display system including means for converting the optical image to an electrical signal which is applied to a filter circuit not responsive to the average value of the signal and including means for inserting an arbitrary average value and for controlling the peak amplitude of the signal and also including a logarithmic amplifier which compresses the dynamic range of instantaneous values of the signal in such a manner that the signal may be applied to a display means which presents the image without optical saturation.

The foregoing and other objects, features and advantages of the invention will be apparent from the following more particular description of a preferred embodiment of the invention as illustrated in the accompanying drawing which is a schematic and block diagram of the preferred embodiment of the invention.

In the drawing, an input data signal film 10 is fed through an optical correlator 12. The optical output from correlator 12 is focused on an image plane 14 and scanned by a conventional scanning disc 16 having an aperture 18 whose size corresponds to each point or elemental area of the image to be scanned. Disposed opposite aperture 18 is a wide dynamic range photodetector 20, such as a very sensitive, wide dynamic range photomultiplier tube. The anode 22 of tube 20 is connected to the positive terminal of a battery 24. The cathode 26 is connected to battery 24 through a resistor 28 and a movable contact 30 which is adjustable along the length of a potentiometer resistor 32 connected across the terminals of the battery.

Cathode 26 is also connected via a coupling capacitor 34 to the input of a logarithmic amplifier 36. The gain of the amplifier can be controlled by means of a variable bias supply 37 connected to amplifier 36. Supply 37 consists of a potentiometer resistor 38 connected across the terminals of a battery 39 and a contact 40 which is adjustable along the length of resistor 38. Contact 40 is connected through a resistor 42 to the junction of capacitor 34 and amplifier 36. The values of capacitor 34 and resistors 42 and 38 are chosen to have an RC time constant such that the average value of the signals from phototube 20 is blocked from the input of amplifier 36 and the instantaneous values corresponding to the scanned points of the image are passed.

The output of amplifier 36 is connected to the control grid 44 of a recording cathode ray tube 46. The tube deflection coils 48 are connected to deflection circuits 50 which are synchronized with the rotation of scanner disc 16. The display on the face of tube 46 may be recorded on a photographic output film 52 which passes close to the face of tube 46. In the preferred embodiment, fiber optics 54 are formed in the face of the tube and film 52 engages the fiber optics.

In the operation of the system illustrated in the drawing, the amplitude of the peak signal from photodetector 20 is adjusted by means of potentiometer 38 such that the maximum light intensities occurring in the optical image in plane 14 are displayed on the cathode ray tube 46 so that the tube phosphor is not saturated by the signals applied to grid 44. Both the maximum and minimum instantaneous output signals from amplifier 36 must fall within a range which permits the corresponding light intensities on the face of the tube to be distinguishable i.e. without saturation. The minimum instantaneous output is adjusted by means of potentiometer 40. These two controls interact in a manner similar to that of the "contrast" and "background" controls on television receivers not employing D.C. restoration.

The image is first scanned and the output on display tube 46 is observed. The gain of phototube 20 is reduced by adjusting potentiometer contact 30 until the output signal from amplifier 36 is such that no saturation occurs in the optical output of display tube 46 for the maximum light intensity occurring in the image points sensed by phototube 20. The lower end of the dynamic output range of amplifier 36 is determined by scanning the image for the minimum intensity point and adjusting movable contact 40 on potentiometer resistor 38 so that the minimum intensity appears readable on the face of display tube 46. This adjustment will also change the maximum intensity adjustment previously made so that potentiometer contact 30 will require readjustment. With a few readjustments of both potentiometer contacts 30 and 40, the signal levels appearing on the output of phototube 20 will be compressed within the usable range of logarithmic amplifier 36 which then functions in a well-known manner to amplify the higher amplitude instantaneous signals less than the lower amplitude signals. More specifically, the output of amplifier 36 is proportional to the square root of the input signal.

This improved image display system is responsive only to the instantaneous levels of the output signal from phototube 20 and is insensitive to the average value of the phototube signal because capacitor 34 and resistors 38 and 42 form a filter circuit which passes the instantaneous values and blocks the average value. Consequently, the instantaneous signal levels corresponding to the elemental or point intensities of the data output image appearing in plane 14 are individually controlled by logarithmic amplifier 36 to produce an unsaturated display on tube 46. If the saturation level of film 52 should be lower than that of tube 36, then the potentiometer contact 30 may be adjusted such that the highest intensity light output from tube 46 does not saturate the film.

The time constant comprising capacitor 34 and the associated resistor networks should be sufficiently long to pass all of the information obtained from the scanner, except for the DC component. Conversely, it must be short enough so that transients have decayed in a reasonable time after new information is inserted into the correlator. There is a wide selection of available time constants within this range and once the scanning data rate has been determined, selection of appropriate time constants can be readily accomplished.

Even though the improved image display has been described in connection with the output of an optical correlator, the system is not limited to such an application. The image in plane 14 may be derived from any optical data processor, radar imagery, both spatial and spectral analysis of spectra, or the simulation of an antenna pattern. The important feature fo the improved system is that individual elements or points of the optical data image are controlled on the basis of their absolute brightness rather than the relationship one to another i.e. average image brightness or intensity.

While the invention has been particularly shown and described with reference to a preferred embodiment thereof, it will be understood by those skilled in the art that various changes in form and details may be made therein without departing from the spirit and scope of the invention.

What is claimed as new is as follows:
1. An optical image display system comprising:
   (a) photoelectric transducer means for sensing the intensity of various points of an optical intensity pattern and producing an electrical signal whose amplitude corresponds to the intensity of each of said points,
   (b) display means,
   (c) non-linear circuit means electrically coupled between said photoelectric transducer means and said display means and responsive to the individual signal amplitude corresponding to each of said points for compressing the signal amplitudes into a range of amplitudes in which saturation of said display means will not occur, and
   (d) a filter circuit connected between said photoelectric transducer means and said non-linear circuit means for blocking the average amplitude of said signal and passing to said non-linear circuit means only the instantaneous point values thereof.
2. An optical image display system as defined in claim 1 wherein said non-linear circuit means comprise a non-linear amplifier.
3. An optical image display system as defined in claim 2 wherein said non-linear amplifier comprises a logarithmic amplifier.
4. An optical image display system as defined in claim 1 wherein said display means comprises a cathode ray tube for producing a visual display of the image.
5. An optical image display system as defined in claim 4 further comprising:
   (a) image scanner means optically coupled to said photoelectric transducer means, and
   (b) means synchronizing said scanner means with the deflection of the ray of said cathode ray tube.
6. An optical image display system as defined in claim 4 further comprising a photographic recording medium adjacent said tube for recording said display of the image, and said non-linear circuit means is responsive to the individual signal characteristic corresponding to each of said intensity points for compressing the signal characteristics into a range of characteristics in which saturation of said recording medium will not occur.
7. An optical image display system as defined in claim 1 wherein said filter circuit comprises a capacitor connected between said photoelectric transducer means and said non-linear circuit means, a first resistor connected to the transducer side of said capacitor, a second resistor connected to the non-linear circuit means side of said capacitor, first adjustable means connected to said first resistor for adjusting the maximum output of said non-linear circuit means, and second adjustable means connected to said second resistor for adjusting the minimum output of said non-linear circuit means.

References Cited

UNITED STATES PATENTS

| | | | |
|---|---|---|---|
| 2,764,697 | 9/1956 | Duke | 178—7.2 |
| 2,961,483 | 11/1960 | Dixon. | |
| 2,976,348 | 4/1961 | Bailey et al. | |
| 3,002,048 | 9/1961 | Bailey et al. | 178—7.2 |
| 3,131,252 | 4/1964 | Farber et al. | |
| 3,131,254 | 4/1964 | Billard et al. | 178—5.2 |
| 3,192,390 | 6/1965 | Ressler | 178—7.2 |
| 3,221,099 | 11/1965 | Bretbord | 178—7.2 |
| 3,351,707 | 11/1967 | Dreyfoos et al. | |

ROBERT L. GRIFFIN, Primary Examiner

A. H. EDDLEMAN, Assistant Examiner

U.S. Cl. X.R.

178—5.2